(12) United States Patent
Gangadharaiah et al.

(10) Patent No.: US 9,824,403 B2
(45) Date of Patent: Nov. 21, 2017

(54) MEASURING PROBLEMS FROM SOCIAL MEDIA DISCUSSIONS

(75) Inventors: Rashmi Gangadharaiah, Bangalore (IN); Nandakishore Kambhatla, Bangalore (IN); Rose C. Kanjirathinkal, Calicut (IN); Amit K. R. Singh, East Mumbai (IN); Karthik Visweswariah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 13/588,146

(22) Filed: Aug. 17, 2012

(65) Prior Publication Data
US 2014/0052842 A1 Feb. 20, 2014

(51) Int. Cl.
G06Q 50/00 (2012.01)
G06Q 30/02 (2012.01)
G06F 17/27 (2006.01)
H04L 29/08 (2006.01)

(52) U.S. Cl.
CPC ......... *G06Q 50/01* (2013.01); *G06F 17/2785* (2013.01); *G06Q 30/0203* (2013.01); *H04L 29/08081* (2013.01); *H04L 29/08099* (2013.01)

(58) Field of Classification Search
CPC .... G06Q 50/01; G06Q 30/02; G06Q 30/0203; H04L 12/588; H04L 51/32; H04L 29/08081; H04L 29/08099; G06F 17/2785
USPC ........................ 709/224, 200, 219
See application file for complete search history.

(56) References Cited

U.S. PATENT DOCUMENTS

| | | | |
|---|---|---|---|
| 7,421,429 B2* | 9/2008 | Thota | G06F 17/30864 |
| 7,974,983 B2 | 7/2011 | Goeldi | |
| 8,676,875 B1* | 3/2014 | Smith | H04L 51/32 705/37 |
| 8,793,154 B2* | 7/2014 | Evans | G06Q 10/10 705/7.11 |
| 9,270,749 B2* | 2/2016 | Kanjirathinkal | H04L 67/104 |

(Continued)

FOREIGN PATENT DOCUMENTS

WO 2011000046 A1 1/2011

OTHER PUBLICATIONS

Bojars, J. et al. "Social Network and Data Portability using Semantic Web Technologies". (2009) [online] Retrieved from the internet <URL:http://sunsite.informatik.rwth-aachen.de/Publications/CEUR-WS/Vol-333/saw1.pdf>.

(Continued)

*Primary Examiner* — Patrice Winder
*Assistant Examiner* — Aye M Aung
(74) *Attorney, Agent, or Firm* — Matthew Frederick Mottice; Isaac J. Gooshaw

(57) ABSTRACT

Embodiments of the present invention provide a system, method, and program product to measure problems from a social media discussion. In exemplary embodiments, a computer extracts one or more problems from the social media discussion. The computer extracts one or more severity indicators and one or more complexity indicators from the social media discussion. The computer clusters the one or more problems into one or more sets of unique problems in a manner that related problems are clustered together into the one or more unique problems. The computer determines an overall severity and an overall complexity of the sets of unique problems.

18 Claims, 4 Drawing Sheets

(56) References Cited

U.S. PATENT DOCUMENTS

| | | | |
|---|---|---|---|
| 2006/0184526 A1* | 8/2006 | Bossemeyer | G06Q 30/02 |
| 2007/0078671 A1* | 4/2007 | Dave | G06Q 10/10 706/45 |
| 2007/0214097 A1* | 9/2007 | Parsons | G06F 17/30864 706/12 |
| 2008/0040427 A1* | 2/2008 | Shroff | G06Q 10/10 709/204 |
| 2008/0233576 A1* | 9/2008 | Weston | C12Q 1/6883 435/6.12 |
| 2009/0063991 A1 | 3/2009 | Baron et al. | |
| 2009/0265332 A1* | 10/2009 | Mushtaq | G06F 17/30 |
| 2009/0292685 A1* | 11/2009 | Liu | G06F 17/30817 |
| 2010/0049590 A1* | 2/2010 | Anshul | G06F 17/2785 705/7.32 |
| 2010/0082613 A1* | 4/2010 | Liu | G06F 17/30675 707/726 |
| 2011/0191372 A1 | 8/2011 | Kaushansky et al. | |
| 2011/0276513 A1 | 11/2011 | Erhart et al. | |
| 2012/0047219 A1* | 2/2012 | Feng | G06F 17/3071 709/207 |
| 2012/0239668 A1* | 9/2012 | Bhattacharyya | G06Q 10/10 707/754 |

OTHER PUBLICATIONS

Cong, G. et al.; "Finding Question-Answer Paris from Online Forums"; SIGIR '08; Jul. 20-24, 2008; Singapore; pp. 467-474; Copyright 2008 ACM 978-1-60558-164-04/08/07.

Ding, S. et al.; "Using Conditional Random Fields to Extract Contexts and Answers of Questions from Online Forums"; Proceedings of ACL-08; Columbus, Ohio; Jun. 2008; pp. 710-718; Copyright 2008 Association of Computational Linguistics.

Garg, D. et al.; "Mining Top Issues from Contact Center Logs for Self Help Portals"; 2008 IEEE International Conference on Services Computing; IEEE Computer Society; pp. 171-178; Copyright 2008 IEEE; DOI 10.1109/SCC.2008.80.

Godbole, N. et al.; "Large-Scale Sentiment Analysis for News and Blogs"; ICWSM 2007 Boulder, Colorado.

He, Yeye and Dong, Xin; "SEISA: Set Expansion by Iterative Similarity Aggregation"; Copyright International World Wide Web Conference Committee (IW3C2); pp. 427-436; WWW 2011; Mar. 28-Apr. 1, 2011; Hyderabad, India.

Hong, Liangjie and Davison, Brian; "A Classification-based Approach to Question Answering in Discussion Boards"; Department of Computer Science and Engineering, Lehigh University, Bethlehem, PA; pp. 171-178; SIGIR 09; Jul. 19-23, 2009, Boston, Massachusetts; Copyright 2009 ACM 978-1-60558-483-06/09/07.

IBM Cognos Consumer Insight Features and Benefits; IBM—Cognos Consumer Insight—Features and Benefits; Printed Jul. 30, 2012.

Jurczyk, Pawel and Agichtein, Eugene; "Discovering Authorities in Question Answer Communities by Using Link Analysis"; Department of Mathematics and Computer Science, Emory University; CIKM 2007; Nov. 6-8, 2007, Lisboa, Portugal; Copyright 2007 ACM 978-1-59593-803-9/07/0011.

Kazai, Gabriella and Milic-Frayling, Natasa; "Trust, Authority and Popularity in Social Information Retrieval"; Microsoft Research, Cambridge, UK; pp. 1503-1504; Copyright held by author/owner(s); CIKM 08; Oct. 26-30, 2008, Napa Valley, California; ACM 978-1-59593-991-03/08/10.

Dave, K. et al.; "Mining the Peanut Gallery: Opinion Extraction and Semantic Classification of Product Reviews"; WWW 2003; May 20-24, 2003, Budapest, Hungary; pp. 519-528; ACM 1-58113-680-3/03/0005; Copyright held by author/owner(s).

Lamkanfi, A. et al.; "Comparing Mining Algorithms for Predicting the Severity of a Reported Bug"; 2011 15th European Conference on Software Maintenance and Reengineering; IEEE Computer Society; pp. 249-258; Copyright 2011 IEEE; DOI 10.1109/CSMR.2011.31.

Lange, C. et al.; "Expressing Argumentative Discussions in Social Media Sites"; <http://ceur-ws.org/Vol-405/paper4.pdf>.

Liu, Xiaoyong, et al.; "Finding Experts in Community-Based Question-Answering Services"; Copyright held by author/owner(s); CIKM 05; Oct. 31-Nov. 5, 2005, Bremen, Germany; ACM 1-59593-140-6/05/0010.

Mangold, Glynn W. and Faulds, David J.; "Social Media: The new hybrid element of the promotion mix"; Business Horizons (2009) 52, 357-365; Copyright 2009 by Kelley School of Business, Indiana University; DOI 10.1016/j.bushor.2009.03.002.

Menzies, Tim and Marcus, Andrian; "Automated Severity Assessment of Software Defect Reports"; pp. 346-355; ICSM 2008; Copyright 2008 IEEE.

Morinaga, S. et al.; "Mining Product Reputations on the Web"; pp. 341-349; NEC Corporation, Kanagawa, Japan; SIGKDD 02 Edmonton, Alberta, Canada; Copyright 2002 ACM 1-58113-567-X/02/0007.

Nasukawa, Tetsuya and Yi, Jeonghee; "Sentiment Analysis: Capturing Favorability Using Natural Language Processing"; pp. 70-77; IBM Research, Tokyo Research Laboratory; K-CAP '03; Oct. 23-25, Sanibel Island, Florida; Copyright 2003 ACM 1-58113-583-1/03/0010.

Pang, B. et al.; "Thumbs up? Sentiment Classification using Machine Learning Techniques"; Proceedings of EMNLP 2002; pp. 79-86.

Ryberg, T.; "Challenges and Potentials for Institutional and Technological Infrastructures in Adopting Social Media"; Department of Communication and Psychology, Aalbor University; ryberg@hum.aau.dk; Proceedings of the 6th International Conference on Networked Learning; ISBN No. 978-1-86220-206-1.

Stolley, Karl; "Integrating Social Media into Existing Work Environments: The Case of Delicious"; Journal of Business and Technical Communication 2009 23: Publisher: SAGE; Originally published online Mar. 17, 2009; DOI: 10.1177/1050651909333260; <http://jbt.sagepub.com/content/23/3/350>.

Wang, Richard and Cohen, William; "Language-Independent Set Expansion of Named Entities using the Web"; pp. 342-350; Seventh IEEE International Conference on Data Mining; IEEE Computer Society; DOI 10.1109/ICDM.2007.104.

Yang, Wen-Yun, et al.; "A Structural Support Vector Method for Extracting Contexts and Answers of Questions from Online Forums"; pp. 514-523; Proceedings of the 2009 Conference on Empirical Methods in Natural Language Processing; Singapore, Aug. 6-7, 2009; Copyright 2009 ACL and AFNLP.

* cited by examiner

MEASURING PROBLEMS FROM SOCIAL MEDIA DISCUSSIONS

FIELD OF THE INVENTION

The present invention relates generally to problems discussed in social media, and more particularly to measuring problems from social media discussions.

BACKGROUND

For a variety of reasons, social media is an excellent source of information. In some cases, mining user-generated content for sentiment analysis is a great way for companies to keep up to date with how consumers are rating products. In many ways, customers are the best functionality testers, and the discussions of customers on chat forums and other social media sites provide great insight into how consumers view products. Many times consumers post about problems or functionality defects of products on social media, as opposed to submitting a formal complaint to the company that produced the products. In this sense, social media may allow a company to obtain feedback about problems associated to products in a more timely manner than waiting to hear about problems through formal complaints.

SUMMARY

Embodiments of the present invention provide a system, method, and program product to measure problems from social media discussion.

In exemplary embodiments, a computer extracts one or more problems from a social media discussion. The computer extracts one or more severity indicators and one or more complexity indicators from the social media discussion. The computer clusters the one or more problems into one or more sets of unique problems in a manner that related problems are clustered together into the one or more unique problems. The computer determines an overall severity and an overall complexity of the sets of unique problems.

DETAILED DESCRIPTION

In brief summary, exemplary embodiments of the present invention are practiced in the context of a social media websites running on a server computer, where the exemplary embodiments are used to access discussions on the social media websites. In examples, after users post comments about products on social media websites, the computer extracts problems the users post that pertain to the products. The computer clusters similar problems discussed on the social media into unique problem sets, and determines the severity and complexity of the unique problem sets. The computer determines an overall global priority of each unique problem set so that another user, such as a company, may determine the unique problem set that may need the most attention.

Embodiments of the present invention will now be described in detail with reference to the accompanying drawings.

Figure 1:
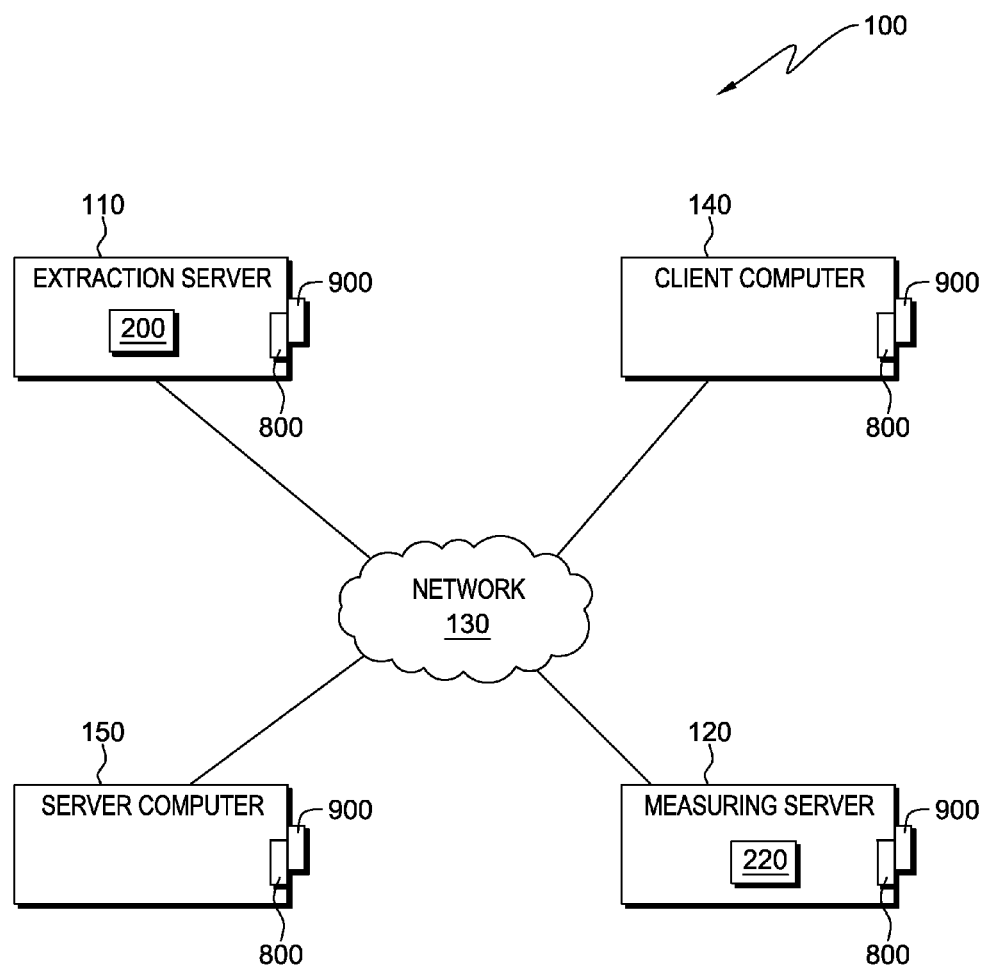
FIG. 1 is a functional block diagram of a social media measuring system in accordance with an embodiment of the present invention.

FIG. 1 is a functional block diagram illustrating a social media measuring system 100 in accordance with an embodiment of the present invention. Social media measuring system 100 includes an extraction server 110, a measuring server 120, a client computer 140, and a server computer 150 interconnected over a network 130.

Extraction server 110 includes an extraction program 200 for extracting information from social media websites, such as discussion forums. Measuring server 120 includes a measuring program 220 for measuring the information extracted from social media websites to determine an overall global priority of each unique problem set.

Extraction server 110, measuring server 120, client computer 140, and server computer 150 include internal components 800 and external components 900. Extraction server 110, measuring server 120, client computer 140, and server computer 150 can be laptop computers, desktop computers, specialized computer servers, or any other computer systems known in the art. In general, extraction server 110, measuring server 120, client computer 140, and server computer 150 can be any programmable electronic devices as described in further detail with regard to FIG. 4. In another embodiment, extraction server 110, measuring server 120, client computer 140, and/or server computer 150 represents a computer system utilizing clustered computers and components to act as a single pool of seamless resources when accessed through a network. For example, this implementation may be preferred for data centers and for cloud computing applications. Further, it should be understood that, for the purpose of illustration, FIG. 1 does not show other computer systems and elements which may be present when using an embodiment of the present invention, such as, for example, additional computer systems in communication with server computer 150 used by users to post feedback in social media website discussions.

In the depicted example, network 130 is the Internet representing a worldwide collection of networks and gateways that use the Transmission Control Protocol/Internet Protocol suite of protocols to communicate with one another. In other examples, network 130 may also be implemented as a number of different types of networks, such as, but not limited to an intranet, a local area network (LAN), or a wide area network (WAN). Examples of network 110 include wire cables, wireless communication links, fiber optic cables, routers, switches, and/or firewalls. In general, network 130 can be any combination of connections and protocols that will support communications between extraction server 110, measuring server 120, client computer 140, and server computer 150 in accordance with an exemplary embodiment of the invention.

In some examples, a storage device (not shown) connected to network 130 may be utilized instead of storing information on extraction server 110, measuring server 120, client computer 140, and/or server computer 150. The storage device may be accessed by extraction server 110, measuring server 120, client computer 140, and/or server computer 150 via network 130. Any form of storage device may be used, either internal and/or external to the computers and/or network 130.

Server computer 150 includes a database containing social media discussion forum information, upon receiving a request from extraction server 110, server computer 150 outputs to extraction server 110 via network 130. Extraction server 110 receives the outputted social media discussion forum information of server computer 150 via network 130 and extracts information from the discussion forums of social media websites by executing extraction program 200. In some examples, the extraction server 110 extracts questions from the discussion forums, extracts answers from the discussion forums, and/or extracts indicators for different aspects relating to the information.

In an example, extraction server 110 includes a database containing the information that was extracted from the social media discussion, upon receiving a request from measuring server 120, or automatically, extraction server 110 outputs to measuring server 120 via network 130. Measuring server 120 receives the outputted information that was extracted from the discussion of extraction server 110 via network 130 and measures the information extracted from the social media websites to determine an overall global priority of each unique problem set by executing measuring program 220.

In an example, measuring server 120 includes a database containing the overall global priorities of each unique problem set, upon receiving a request from client computer 140, or automatically, measuring computer 120 outputs to client computer 140 via network. Client computer 140 receives the outputted overall global priorities of each unique problem set of measuring computer 120 via network 130, and maps scores for the sets of each unique problem.

Figure 2:
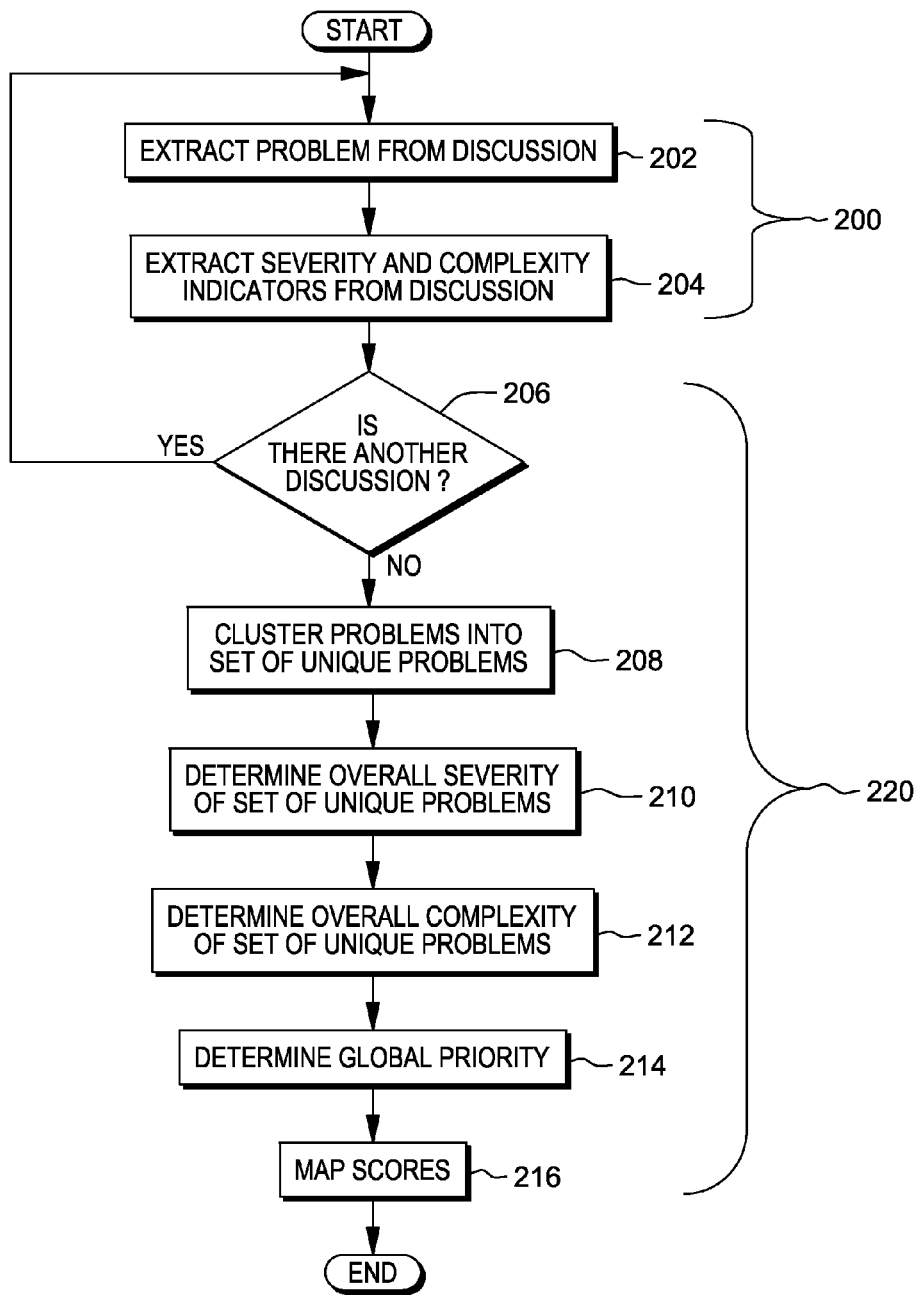
FIG. 2 is a flowchart illustrating the basic operational steps for an embodiment of the present invention.

FIG. 2 is a flow chart illustrating the basic operational steps of extraction program 200 and measuring program 220. In step 202, extraction program 200 extracts one or more problems from one or more discussions located in a discussion forum of a social media website. In an example, extraction program 200 extracts one or more problems from each discussion located in the discussion forum of a social media website. In this example, for each discussion ($D_i$), a problem ($P_{Di}$) is extracted by extraction program 200. In an example, extraction program 200 extracts problems by extracting questions from discussion forms using a labeled sequential pattern based algorithm. In another example, extraction program 200 extracts problems by extracting answers from discussion forums using unsupervised method like graph propagation and/or supervised methods like conditional random fields or support vector methods.

In step 204, extraction program 200 extracts severity indicators and complexity indicators for each discussion ($D_i$). In one example, extraction program 200 extracts severity and complexity Indicators I1, I2, etc., (where I1 is the frequency of occurrence, and I2 is the urgency of the problem, etc.).

In one example, the indicators are grouped into two distinct groups: Lexical (LEX), which takes cues from words or phrases used in the text of the discussion, and Structural (STRUCT), which uses the structure and forum-specific features of the discussion. In this example, some indicators may be extracted using cure from the words or phrases mentioned in the discussion. An indicator may be usability (L1), which indicates if the discussion thread includes terms indicating that the product is no longer usable or has limited functionality, then this indicates that the problem could be severe. Terms such as, \freeze", \broken", etc., indicate that the product is unusable and may require immediate attention if many users face the same issue. Another indicator extracted by extraction program 200 may be negative emotion (L2), which indicates outbursts of anger or terms indicating that the product is no longer usable or has limited functionality may indicate that the problem is severe. Problems in discussion forums are usually accompanied by terms such as \annoy", \frustrating", etc., indicating that the user is not satisfied with the product. Another indicator extracted by extraction program 200 may be the frequency of the occurrence of the problem (L3), which indicates problems that appear to frequently lead to frustration and need immediate attention. Indicators for this feature include terms such as, \frequently" and \always". Another indicator extracted by extraction program 200 may be urgency (L4), which indicates terms that correlate with desperation and urgency from the side of the user. Examples include, \urgently", \immediately", etc. Another indicator extracted by extraction program 200 may be the number of people affected (L5), which indicates when a problem is severe, many users reply to the main post (initiated by the thread initiator) indicating that they too faced a similar problem. Phrases such as, \same issue", \same problem", etc., in subsequent replies posted in the thread indicate that other users have also faced the same issue. Another indicator extracted by extraction program 200 may be the result of the problem (L6), which indicates the resultant outcome of the problem. In an example, the result may be that the consumer returned a purchased item back to a store or the manufacturer, or maybe the consumer reverted to using an older version of the purchased item.

In this example, some indicators may be extracted using structural and forum-specific features of the discussion thread. An indicator may be rating of the problem author (S1), which indicates novice users or beginners usually post queries which are usually mentioned in FAQs or product manuals, while expert users who have a better knowledge of the product tend to post real or difficult problems that require more attention. Another indicator extracted by extracted program 200 may be the length of thread (S2), which indicates when an issue is severe; discussions tend to grow longer than issues that have straight forward solutions or workarounds. Severe issues involve exploring different suggestions posted by other users until the issue is resolved or the thread initiator gives up. Hence, this forms a good indicator for predicting severity. Another indicator extracted by extracted program 200 may be the rating of post authors (S3), which indicates authors of high rating or more expertise (assuming this is already available in the discussion forum) are involved in the discussion, this feature forms a strong indicator that the problem being discussed is highly severe. The counts are grouped by the ratings. Another indicator extracted by extracted program 200 may be the time duration (S4), which indicates the time elapsed (in minutes) starting from when the question was posted to the time when the thread was closed or the last post was entered. The longer the discussion lasts, more severe is the problem.

In some examples, the different indicators extracted from discussion threads may be used by extraction program 200 to determine the severity and/or complexity of each problem found in the discussion threads. In an example, some of the indicators that may be used to determine the severity of a problem, may be, but are not limited to: the usability of the device after the problem occurs, the frequency of the problem occurring, the result of the problem, the number of individuals affected by the problem, the words indicating urgency of the problem, the words indicating importance of the problem, and the popularity of the authors. In an example, some of the indicators that may be used to determine the complexity of a problem, may be, but not limited to: the number of posts that give suggestions in the discussion thread, the number of different potential answers for a problem, the number of technical steps in the answer, the presence of certain pre-identified steps in the solutions that are complex for the user to execute, the time taken to resolve the problem, the number of inquires about the state of the system and/or different variables before the system exhibited the issue, and the expert level of the individual that resolved the issue.

In an example, extraction program 200 determines the severity of Pi w.r.t. Di using the following equations:

$$\text{Severity } S(P_{Di})=F_s(I1,I2,\ldots)$$

$$\text{Complexity } C(P_{Di})=F_C(I1,I2,\ldots) \qquad \text{Equation 1, Equation 2}$$

where, Fs is a function that computes a severity score from individual indicator scores; Fc is a function that computes a complexity score from individual indicator scores; and (I1, I2, . . . ) is a weighted average of scores.

In step 206, extraction program 200 determines if there is an additional discussion thread where problems may need to be extracted. In an example, the extraction program 200 determines whether or not discussion threads on predetermined social media websites have been extracted. In this example, a user may predetermine from which social media websites discussion boards extraction program 200 extracts problems. In another example, extraction program 200 automatically determines relevant social media website discussion boards by crawling through websites. If extraction program 200 determines that there is an additional discussion thread where problems may need to be extracted (positive branch of decision 206), extraction program loops back to step 202.

If extraction program 200 determines that there are not additional discussion threads where problems may need to be extracted (negative branch of decision 206), measuring program 220 clusters problems into sets of unique problems (step 208). In an example, the problems are extracted out of all the discussion threads to cluster the problems into the sets of unique problems using the following equation:

$$\pi=\{P1,P2,\ldots\} \qquad \text{Equation 3}$$

In step 210, measuring program 220 determines an overall severity of the sets of unique problems. In an example, measuring program 220 may determine the overall severity of the sets of unique problems using the following equation:

$$S_{corpus}(Pj)=A_s(S(P_{Di})) \qquad \text{Equation 4}$$

for all $P_{Di}$ that belongs to the set of Pj and where $A_s$ is an aggregator function for severity (e.g., average of the scores).

In step 212, measuring program 220 determines an overall complexity of the sets of unique problems. In an example, measuring program 220 may determine the overall complexity of the sets of unique problems using the following equation:

$$C_{corpus}(Pj)=A_C(S(P_{Di})) \qquad \text{Equation 5}$$

for all $P_{Di}$ that belongs to the set of Pj and where $A_C$ is an aggregator function for complexity (e.g., average of the scores).

In step 214, measuring program 220 determines a global priority of the sets of unique problems. In an example, measuring program 220 may determine the global priority of the sets of unique problems, for each problem Pj in π, using the following equation:

$$\text{Priority}_{corpus}(Pj)=A_P(S_{Corpus}(P_j),C_{Corpus}(P_j)) \qquad \text{Equation 6}$$

where the priority indicates the order in which the sets of unique problems should be fixed, and $A_P$ is an aggregator function of severity and complexity scores of the sets of unique problems (e.g., average of severity and complexity scores).

In some examples, extraction program 200 and/or measuring program 220 receive feedback for any of the severity, complexity, and/or priority from a user. Extraction program 200 and/or measuring program 220 updates the corresponding function using the feedback provided by the user. In an example, extraction program 200 and/or measuring program 220 receives feedback from a user through a user interface.

In step 216, measuring program 220 maps the global priority scores of the sets of unique problems. In an example, all of the global priority scores of the sets of unique problems are mapped to a company-specific qualitative value, such as, High, Medium, and Low. In other examples, other forms of mapping may occur.

Operational steps 202 through 216 are illustrative of one or more embodiments of the present invention. It should be understood that the content of each step, as well as the order of operation, can be modified without departing from the spirit and intended scope of the present invention.

Figure 3:
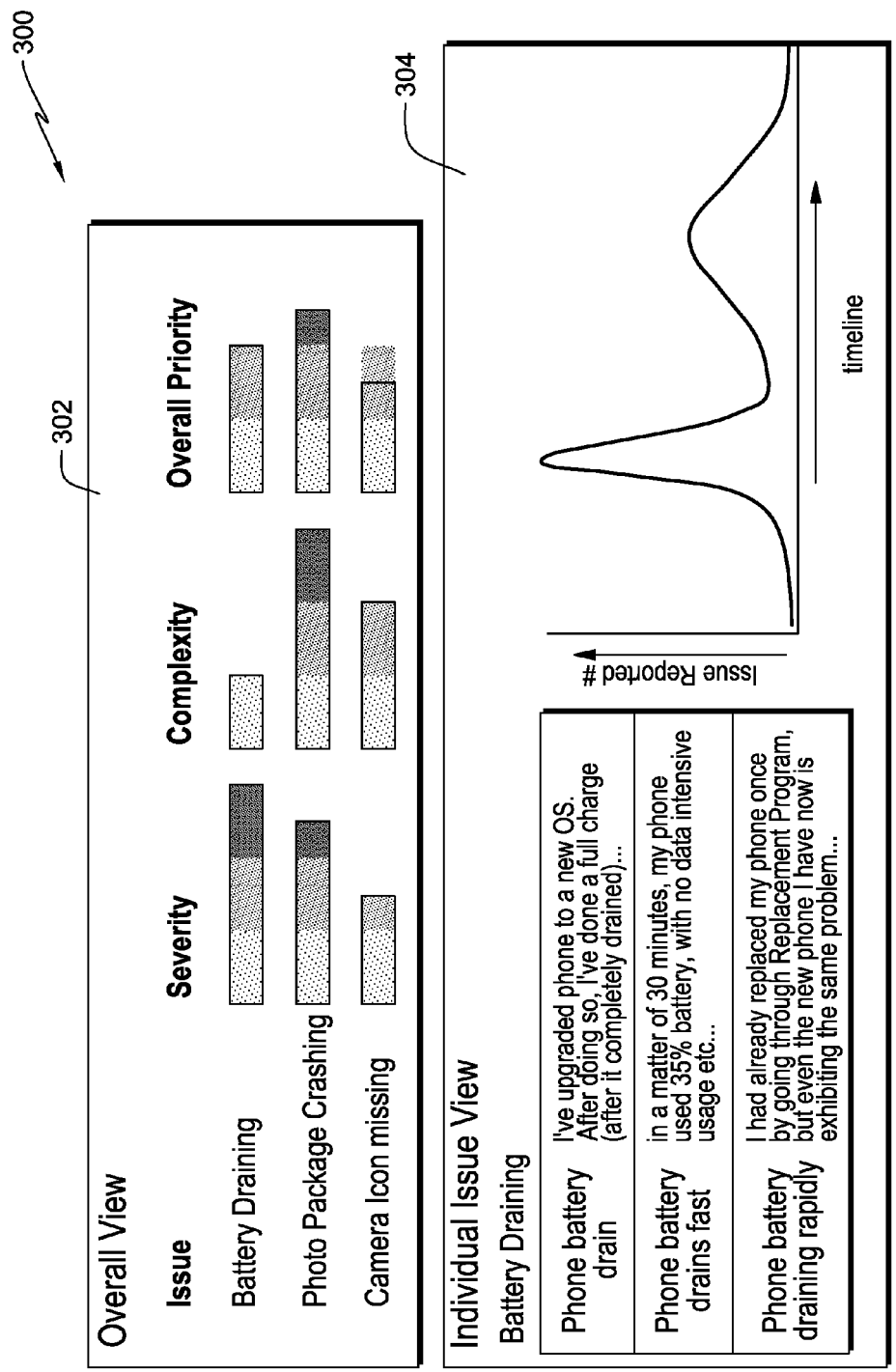
FIG. 3 depicts an illustration of a user interface for measuring problems from social media discussions in accordance with embodiments of the present invention.

FIG. 3 depicts an illustration of a user interface 300, sometimes referred to as a dashboard, for measuring problems from social media discussions in accordance with embodiments of the present invention. User interface 300 may be a depiction indicating the mapping of the global priority scores of the sets of unique problems by measuring program 220. In this example, user interface 300 includes a first area 302 that depicts the overall view of the sets of unique problems. User interface 400 includes a second area 304 that depicts the individual views of the sets of problems and/or issues that relate to discussion threads. In this example, the individual problems within the set of unique problems are depicted, along with a timeline that depicts the amount of problems extracted from discussion threads in relation to the time when the problems were posted on the discussion threads.

Figure 4:
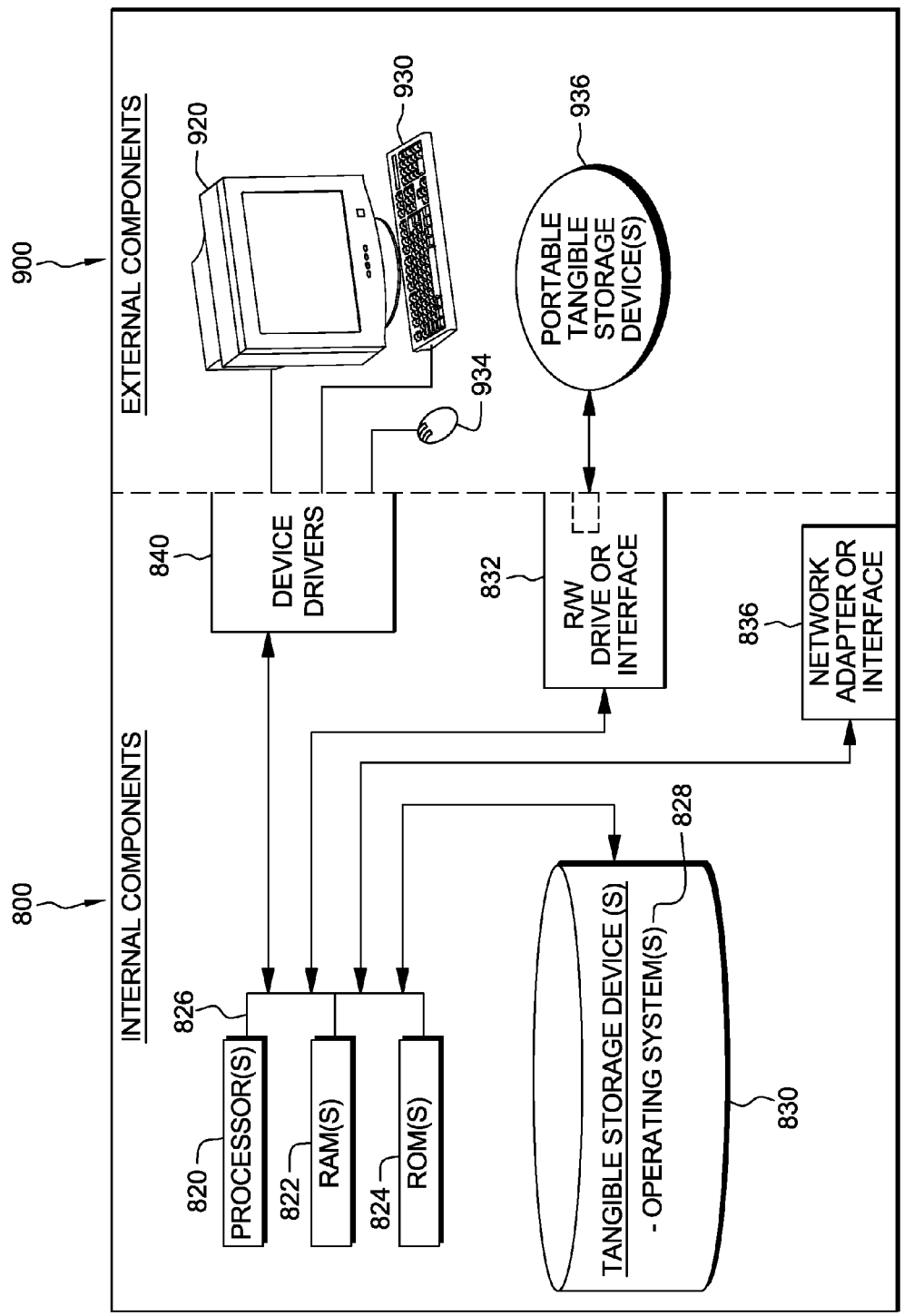
FIG. 4 is a block diagram of hardware and software within and external to the computing device and computer servers of FIG. 1 in accordance with an embodiment of the present invention.

FIG. 4 shows a block diagram of internal components 800 and external components 900 of extraction server 110, measuring server 120, client computer 140, and server computer 150 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Computer system 800, 900 is representative of any electronic device capable of executing machine-readable program instructions. Computer system 800, 900 may be representative of a smart phone, a computer system, PDA, or other electronic devices. Examples of computing systems, environments, and/or configurations that may represented by computer system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Extraction server 110, measuring server 120, client computer 140, and server computer 150 include respective sets of internal components 800 and external components 900 illustrated in FIG. 4. Each of the sets of internal components 800 includes one or more processors 820, one or more computer-readable RAMs 822 and one or more computer-readable ROMs 824 on one or more buses 826, one or more operating systems 828, and one or more computer-readable tangible storage devices 830. The one or more operating systems 828 and extraction program 200 in extraction server 110 and measuring program 220 in measuring server, as well as any necessary operating systems and other software in extraction server 110, measuring server 120, client computer 140, and server computer 150, are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. Extraction program 200 in extraction server 110 and measuring program 220 in measuring server, as well as any necessary operating systems and other software in extraction server 110, measuring server 120, client computer 140, and server computer 150, can be stored on one or more of the respective portable computer-readable tangible storage devices 936, read via the respective R/W drive or interface 832 and loaded into the respective computer-readable tangible storage device 830.

Each set of internal components 800 also includes one or more network adapters or interfaces 836 such as a TCP/IP adapter cards, wireless Wi-Fi interface cards, or 3G or 4G wireless interface cards or other wired or wireless communication links. The extraction program 200 and measuring program 220 in extraction server 110, as well as any necessary software in measuring server 120 can be downloaded to the respective computer systems from an external computer via a network (for example, the Internet, a local area network or other, wide area network) and respective network adapters or interfaces 836. From the one or more network adapters or interfaces 836, extraction program 200 and measuring program 220 in extraction server 110, as well as any necessary software in measuring server 120, are loaded into the respective computer-readable tangible storage device 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832, and one or more network adapters or interfaces 836 comprise hardware and software (stored in computer-readable tangible storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive nor to limit the invention to the precise forms disclosed. Many modifications and variations are possible. Such modifications and variations that may be apparent to a person skilled in the art of the invention are intended to be included within the scope of the invention as defined by the accompanying claims.

What is claimed is:

1. A method for providing notification of a priority to correct a limited functionality of a feature of a product, the method comprising:

a computer using at least a lexical analysis technique and a structural analysis technique to determine, for a content of a social media discussion, (i) a lexical characteristic of the social media discussion, (ii) a structural characteristic of the social media discussion, (iii) a product being discussed in the social media discussion (iv) a user opinion of a feature of the product, and (v) an emotion of the user that is likely associated with the feature of the product;

the computer generating one or more problem statements that indicate that a limited functionality exists for at least the feature of the product based, at least in part, on the lexical characteristic of the social media discussion, the structural characteristic of the social media discussion, the product being discussed in the social media discussion, and the user opinion of the feature of the product;

the computer generating (i) one or more severity indicators that indicate a severity of the limited functionality and (ii) one or more complexity indicators for the one or more problem statements that indicate a predicted difficulty of correcting the limited functionality based, at least in part, on the lexical characteristic and the structural characteristic of the social media discussion, wherein the severity correlates, at least in part, to (a) the user opinion of the feature and (b) the emotion of the user that is associated with the feature of the product, and wherein the predicted difficulty correlates, at least in part, to a determined level of experience of a participant that contributed to the social media discussion;

the computer clustering the one or more problem statements into one or more sets of unique problem statements for the product such that similar problem statements are clustered together into a given set of unique problem statements, and wherein the given set of unique problem statements is associated with a particular limited functionality for the feature of the product that is dictated by the clustering;

the computer generating, for the given set of unique problem statements, a priority indicator that indicates a priority for correcting the limited functionality, an overall severity indicator that indicates an average severity of the limited functionality, and an overall complexity indicator that indicates an average of predicted difficulty of correcting the limited functionality included in the one or more sets of unique problem statements for the product based, at least in part on, a number of problem statements included in the given set of unique problem statements, wherein the priority indicates a level of urgency associated with a correction of the given set of unique problem statements; and the computer sending a message to a user that indicates (i) that the limited functionality exists for at least the feature of the product, (ii) the priority for correcting the limited functionality, (iii) and at least one of the overall severity indicator, and the overall complexity indicator.

2. The method of claim 1, further comprising the computer mapping scores for the one or more sets of unique problem statements.

3. The method of claim 2, wherein the mapping scores for the one or more sets of unique problem statements are mapped to a company-specific qualitative value.

4. The method of claim 1, wherein the step of the computer generating one or more problem statements from the social media discussion uses a labeled sequential pattern based algorithm, a graph propagation method, a conditional random field method or a support vector method.

5. The method of claim 1, wherein the social media discussion is a blog.

6. The method of claim 1, further comprising:
the computer receiving feedback for the overall severity or the overall complexity for the one or more sets of unique problem statements.

7. A computer program product for measuring problems from a social media discussion, the computer program product comprising:
one or more computer-readable tangible storage devices;
program instructions stored on at least one of the one or more computer-readable tangible storage devices, the program instructions comprising:
program instructions to use at least a lexical analysis technique and a structural analysis technique to determine, for a content of a social media discussion, (i) a lexical characteristic of the social media discussion, (ii) a structural characteristic of the social media discussion, (iii) a product being discussed in the social media discussion (iv) a user opinion of a feature of the product, and (v) an emotion of the user that is likely associated with the feature of the product;
program instructions to generate one or more problem statements that indicate that a limited functionality exists for at least the feature of the product based, at least in part, on the lexical characteristic of the social media discussion, the structural characteristic of the social media discussion, the product being discussed in the social media discussion, and the user opinion of the feature of the product;
program instructions to generate (i) one or more severity indicators that indicate a severity of the limited functionality and (ii) one or more complexity indicators for the one or more problem statements that indicate a predicted difficulty of correcting the limited functionality based, at least in part, on the lexical characteristic and the structural characteristic of the social media discussion, wherein the severity correlates, at least in part, to (a) the user opinion of the feature and (b) the emotion of the user that is associated with the feature of the product, and wherein the predicted difficulty correlates, at least in part, to a determined level of experience of a participant that contributed to the social media discussion;
program instructions to cluster the one or more problem statements into one or more sets of unique problem statements for the product such that similar problem statements are clustered together into a given set of unique problem statements, and wherein the given set of unique problem statements is associated with a particular limited functionality for the feature of the product that is dictated by the clustering;
program instructions to generate, for the given set of unique problem statements, a priority indicator that indicates a priority for correcting the limited functionality, an overall severity indicator that indicates an average severity of the limited functionality, and an overall complexity indicator that indicates an average of predicted difficulty of correcting the limited functionality included in the one or more sets of unique problem statements for the product based, at least in part on, a number of problem statements included in the given set of unique problem statements, wherein the priority indicates a level of urgency associated with a correction of the given set of unique problem statements; and
program instructions to send a message to a user that indicates (i) that the limited functionality exists for at least the feature of the product, (ii) the priority for correcting the limited functionality, (iii) and at least one of the overall severity indicator, and the overall complexity indicator.

8. The computer program product of claim 7, further comprising:
program instructions stored on at least one of the one or more computer-readable tangible storage devices, to map scores for the one or more sets of unique problem statements.

9. The computer program product of claim 8, wherein the mapping scores for the one or more sets of unique problem statements are mapped to a company-specific qualitative value.

10. The computer program product of claim 7, wherein the program instructions of the computer generating one or more problem statements from the social media discussion uses a labeled sequential pattern based algorithm, a graph propagation method, a conditional random field method or a support vector method.

11. The computer program product of claim 7, wherein the social media discussion is a blog.

12. The computer program product of claim 7, further comprising:
program instructions stored on at least one of the one or more computer-readable tangible storage devices, to receive feedback for the overall severity or the overall complexity for the one or more sets of unique problem statements.

13. A computer system for measuring problems from a social media discussion, the computer system comprising;
one or more processors, one or more computer-readable memories, one or more computer-readable tangible storage devices, and program instructions stored on the one or more computer-readable tangible storage devices for execution by at least one of the one or more processors, the program instructions comprising:
program instructions to use at least a lexical analysis technique and a structural analysis technique to determine, for a content of a social media discussion, (i) a lexical characteristic of the social media discussion, (ii) a structural characteristic of the social media discussion, (iii) a product being discussed in the social media discussion (iv) a user opinion of a feature of the product, and (v) an emotion of the user that is likely associated with the feature of the product;
program instructions to generate one or more problem statements that indicate that a limited functionality exists for at least the feature of the product based, at least in part, on the lexical characteristic of the social media discussion, the structural characteristic of the social media discussion, the product being discussed in the social media discussion, and the user opinion of the feature of the product;
program instructions to generate (i) one or more severity indicators that indicate a severity of the limited functionality and (ii) one or more complexity indicators for the one or more problem statements that indicate a predicted difficulty of correcting the limited functionality based, at least in part, on the lexical characteristic and the structural characteristic of the social media discussion, wherein the severity correlates, at least in part, to (a) the user opinion of the feature and (b) the emotion of the user that is associated with the feature of the product, and wherein the predicted difficulty correlates, at least in part, to a determined level of experience of a participant that contributed to the social media discussion;
program instructions to cluster the one or more problem statements into one or more sets of unique problem statements for the product such that similar problem statements are clustered together into a given set of unique problem statements, and wherein the given set of unique problem statements is associated with a particular limited functionality for the feature of the product that is dictated by the clustering;
program instructions to generate, for the given set of unique problem statements, a priority indicator that indicates a priority for correcting the limited functionality, an overall severity indicator that indicates an average severity of the limited functionality, and an overall complexity indicator that indicates an average of predicted difficulty of correcting the limited functionality included in the one or more sets of unique problem statements for the product based, at least in part on, a number of problem statements included in the given set of unique problem statements, wherein the priority indicates a level of urgency associated with a correction of the given set of unique problem statements; and
program instructions to send a message to a user that indicates (i) that the limited functionality exists for at least the feature of the product, (ii) the priority for correcting the limited functionality, (iii) and at least one of the overall severity indicator, and the overall complexity indicator.

14. The computer system of claim 13, further comprising:
program instructions, stored on at least one of the one or more computer-readable tangible storage devices for execution by at least one of the one or more processors via at least one of the one or more memories, to map scores for the one or more sets of unique problem statements.

15. The computer system of claim 14, wherein the mapping scores for the one or more sets of unique problem statements are mapped to a company-specific qualitative value.

16. The computer system of claim 13, wherein the program instructions of the computer generating one or more problem statements from the social media discussion uses a labeled sequential pattern based algorithm, a graph propagation method, a conditional random field method or a support vector method.

17. The computer system of claim 13, wherein the social media discussion is a blog.

18. The method of claim 13, further comprising:
program instructions stored on at least one of the one or more computer-readable tangible storage devices, to receive feedback for the overall severity or the overall complexity for the one or more sets of unique problem statements.

* * * * *